(12) United States Patent
Yamamoto

(10) Patent No.: US 10,500,904 B2
(45) Date of Patent: Dec. 10, 2019

(54) TIRE

(71) Applicant: BRIDGESTONE CORPORATION, Chuo-ku, Tokyo (JP)

(72) Inventor: Nobuyuki Yamamoto, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 791 days.

(21) Appl. No.: 14/898,546

(22) PCT Filed: Jul. 9, 2014

(86) PCT No.: PCT/JP2014/003648
§ 371 (c)(1),
(2) Date: Dec. 15, 2015

(87) PCT Pub. No.: WO2015/004913
PCT Pub. Date: Jan. 15, 2015

(65) Prior Publication Data
US 2016/0137006 A1 May 19, 2016

(30) Foreign Application Priority Data
Jul. 12, 2013 (JP) .................................. 2013-146653

(51) Int. Cl.
*B60C 11/12* (2006.01)
*B60C 11/13* (2006.01)
*B60C 11/03* (2006.01)

(52) U.S. Cl.
CPC ...... *B60C 11/1263* (2013.01); *B60C 11/0327* (2013.01); *B60C 11/125* (2013.01);
(Continued)

(58) Field of Classification Search
CPC .......................... B60C 11/1263; B60C 11/125
See application file for complete search history.

(56) References Cited

U.S. PATENT DOCUMENTS

| 6,050,313 A * | 4/2000 | Tsuda ...................... B60C 11/12 |
| | | 152/209.18 |
| 2010/0200138 A1* | 8/2010 | Shibano .................. B60C 11/12 |
| | | 152/209.25 |

FOREIGN PATENT DOCUMENTS

| CN | 101370674 A | 2/2009 |
| CN | 102596595 A | 7/2012 |

(Continued)

OTHER PUBLICATIONS

Machine translation for Japan 2012-111438 (Year: 2018).*
(Continued)

*Primary Examiner* — Steven D Maki
(74) *Attorney, Agent, or Firm* — Kenja IP Law PC

(57) ABSTRACT

A tire includes a plurality of land portions defined by a plurality of circumferential grooves, and each of the plurality of land portions has a plurality of lateral grooves crossing the land portion. Each of the plurality of lateral grooves is made up of a center region extending at an angle of inclination relative to a tread width direction and side regions extending at a smaller angle of inclination relative to the tread width direction than the center region, the side regions increasing in groove width toward the respective circumferential grooves. Each of the plurality of lateral grooves has a sipe having, only in the center region, a shallow portion with a smaller depth, the shallow portion being located at least near a boundary part between the center region and each of the side regions with a starting point of the shallow portion being apart from the boundary part.

9 Claims, 3 Drawing Sheets

(52) U.S. Cl.
CPC ................ *B60C 2011/0334* (2013.01); *B60C 2011/0353* (2013.01); *B60C 2011/0365* (2013.01)

(56) References Cited

FOREIGN PATENT DOCUMENTS

| | | | |
|---|---|---|---|
| CN | 102649389 A | | 8/2012 |
| CN | 204020427 U | | 12/2014 |
| EP | 0844107 A2 | | 5/1998 |
| JP | 63-137003 A | * | 6/1988 |
| JP | H10-151915 A | | 6/1998 |
| JP | H10-309910 A | | 11/1998 |
| JP | 2001-055013 A | * | 2/2001 |
| JP | 2002-103922 A | | 4/2002 |
| JP | 2008-155789 A | | 7/2008 |
| JP | 2008-222075 A | | 9/2008 |
| JP | 2010-179827 A | | 8/2010 |
| JP | 2010-254154 A | | 11/2010 |
| JP | 2012-111438 A | * | 6/2012 |
| JP | 2012-179965 A | | 9/2012 |
| JP | 2013-052789 A | | 3/2013 |

OTHER PUBLICATIONS

Machine translation for Japan 2001-055013 (Year: 2018).*
Machine translation for Japan 63-137003 (Year: 2018).*
Oct. 14, 2014, International Search Report issued in International Patent Application No. PCT/JP2014/003648.

* cited by examiner

// TIRE

TECHNICAL FIELD

The disclosure relates to a tire that can suppress uneven wear of the tread surface while maintaining steering stability and drainage performance on wet road surfaces.

BACKGROUND

In conventional tires, each of the land portions defined by circumferential grooves in the tread surface has a plurality of lateral grooves or sipes crossing the land portion, for improved wet performance. Patent Literature (PTL) 1 discloses a tire that, while maintaining improved wet performance by shallow grooves (lateral grooves) and sipes formed at the groove bottoms of the shallow grooves (lateral grooves), has all shallow grooves (lateral grooves) and sipes inclined in the same direction relative to the tire axial direction in order to suppress uneven wear around the sipes in the tire circumferential direction.

CITATION LIST

Patent Literature

PTL 1: JP 2002-103922 A

SUMMARY

Technical Problem

However, in the tread having such inclined lateral grooves, acute-angled portions of the corners of the blocks defined by the lateral grooves and the circumferential grooves have lower rigidity than their surrounding portions. This may cause uneven wear around the corners of the blocks, which needs to be improved. It could therefore be helpful to provide a tire that can suppress uneven wear around the corners of the blocks in the tread surface while maintaining steering stability and drainage performance on wet road surfaces.

Solution to Problem

We provide the following:

(1) The disclosed tire is a tire in which a plurality of land portions are defined in a tread surface by a plurality of circumferential grooves extending in a tire circumferential direction, and each of the plurality of land portions has a plurality of lateral grooves crossing the land portion, wherein the plurality of lateral grooves are arranged so that, when the plurality of lateral grooves are projected onto a tire equatorial plane, lateral grooves adjacent in the tire circumferential direction do not overlap each other, each of the plurality of lateral grooves is made up of a center region extending at an angle of inclination relative to a tread width direction and side regions extending from both ends of the center region toward respective circumferential grooves at a smaller angle of inclination relative to the tread width direction than the center region, the side regions increasing in groove width toward the respective circumferential grooves, and each of the plurality of lateral grooves has a sipe leading inward in a tire radial direction from a groove bottom of the lateral groove, and the sipe has, only in the center region, a shallow portion with a smaller depth, the shallow portion being located at least near a boundary part between the center region and each of the side regions with a starting point of the shallow portion being apart from the boundary part.

With this structure, the difference in rigidity between the corners of the blocks defined by the circumferential grooves and the lateral grooves and their surrounding portions is reduced, so that uneven wear around the corners of the blocks can be suppressed. Moreover, sufficient drainage paths are secured in the lateral grooves to maintain the drainage performance of the tread, and also the rigidity of the land portions in the tire circumferential direction is ensured to maintain steering stability on wet road surfaces.

Note that the depth of the sipe mentioned in the disclosure means the length of the sipe in the tire radial direction.

(2) In the disclosed tire, preferably, a depth of the sipe in the side regions is not less than a maximum depth of the sipe in the center region. With this structure, sufficient wet performance is ensured over the long term until the late stage of tire use.

(3) In the disclosed tire, preferably, a clearance distance between the boundary part and the starting point of the shallow portion is 1.0 mm or more and 3.0 mm or less along an extension direction of the lateral groove at a position of the shallow portion. With this structure, uneven wear of the tread can be reduced more reliably.

(4) In the disclosed tire, preferably, three or more circumferential grooves are formed in the tread surface, and a pair of circumferential grooves outermost in the tread width direction are wider than a circumferential groove other than the pair of circumferential grooves. With this structure, the land portions between the circumferential grooves can support each other in the tread width direction, which enhances rigidity. Steering stability on wet road surfaces can be improved in this way.

(5) In the disclosed tire, preferably, a lateral groove of a land portion adjacent to one side of the other circumferential groove and a lateral groove of a land portion adjacent to the other side of the other circumferential groove are open to the other circumferential groove at the same position in the tire circumferential direction. With this structure, drainage efficiency increases, and drainage performance on wet road surfaces can be further improved.

Advantageous Effect

It is thus possible to provide a tire that can suppress uneven wear around the corners of the blocks in the tread surface while maintaining steering stability and drainage performance on wet road surfaces.

DETAILED DESCRIPTION

Figure 1:
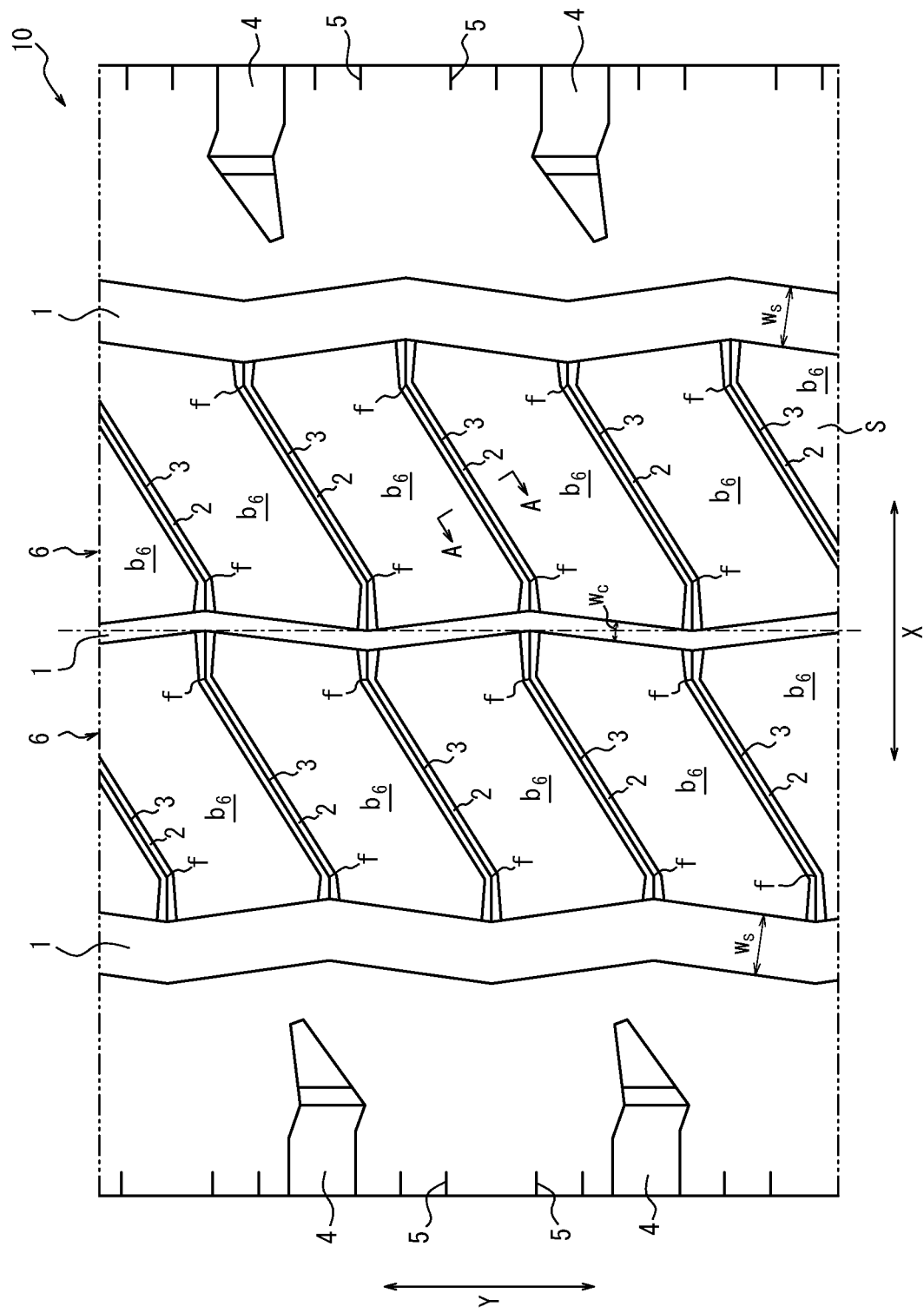
FIG. 1 is a partial development view illustrating the tread surface of a tire according to one of the embodiments.

A tire according to one of the embodiments is described in detail below, with reference to drawings. FIG. 1 is a partial development view illustrating the tread surface S of a tire 10 according to one of the embodiments. Although not illustrated, the tire 10 includes a carcass made up of plies of organic fiber cords or steel cords extending between a pair of bead portions, and belts made up of steel cord layers and a tread on the outer side of the carcass in the tire radial direction.

In the tread surface S of the tire 10, two land portions 6 are defined by a plurality of circumferential grooves 1 (three circumferential grooves 1 in the illustrated example) extending in the tire circumferential direction (direction Y in FIG. 1). Each of the two land portions 6 has a plurality of lateral grooves 2 that cross the land portion 6 and is inclined relative to the tread width direction. Thus, three circumferential grooves 1 and a plurality of lateral grooves 2 define a plurality of blocks $b_6$ in the tread surface 6. The lateral grooves 2 are arranged so that, when the lateral grooves 2 are projected onto the tire equatorial plane CL, lateral grooves 2 adjacent in the tire circumferential direction (lateral grooves 2 adjacent in the tire circumferential direction in the same land portion 6 in the illustrated example) do not overlap each other. The direction in which each lateral groove 2 extends changes at two boundary parts f near both ends of the lateral groove 2 in the tread width direction. Although the boundary parts f have a bend shape with an angle in this embodiment, the boundary parts f may be shaped like a gentle arc. Although the circumferential grooves 1 have a zigzag shape in the illustrated example, the circumferential grooves 1 may have another shape such as linear or wavy.

Figure 2:
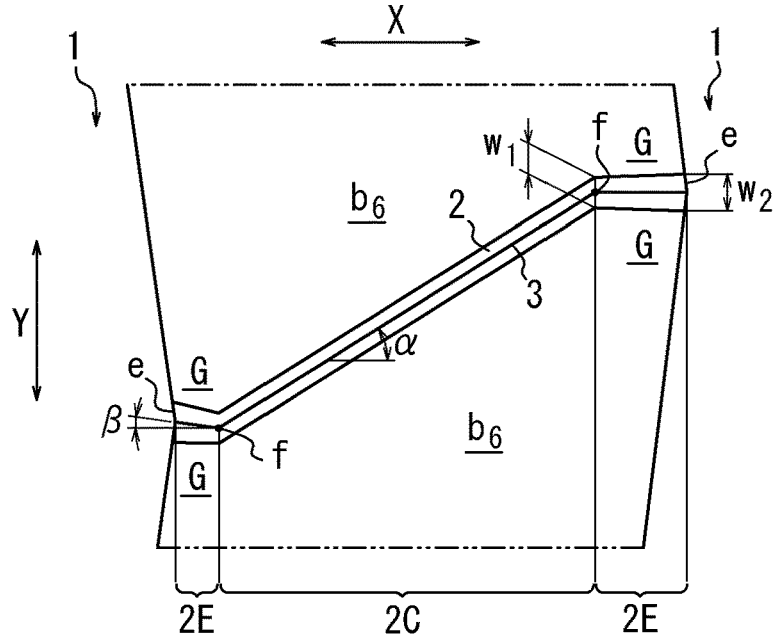
FIG. 2 is an enlarged view of a lateral groove illustrated in FIG. 1.

FIG. 2 is an enlarged view of each of the lateral grooves 2 mentioned above. The disclosed tire has important features that the lateral groove 2 is made up of a center region 2C extending at an angle of inclination relative to the tread width direction and side regions 2E extending from both ends of the center region 2C toward the respective circumferential grooves 1 at a smaller angle of inclination relative to the tire width direction than the center region 2C, the side regions 2E increasing in groove width toward the respective circumferential grooves 1. In other words, the inclination angle $\beta$ of the lateral groove 2 relative to the tread width direction in each side region 2E is smaller than the inclination angle $\alpha$ of the lateral groove 2 relative to the tread width direction in the center region 2C, and the groove width of the lateral groove 2 in each side region 2E changes so that the groove width $W_2$ at the end edge e of the lateral groove 2 is greater than the groove width $W_1$ at the boundary part f of the lateral groove 2. Although the groove width of the lateral groove 2 in each side region 2E gradually increases from the boundary part f to the end edge e in the illustrated example, the groove width may be changed at at least one part of the side region 2E so that $W_1 < W_2$.

A tire having lateral grooves extending at an angle of inclination relative to the tread width direction typically facilitates drainage between the road surface and the tread surface, as compared with a tire having lateral grooves extending along the tread width direction. When such a tire runs on a wet road surface, a water film is unlikely to be formed on the tread surface. The tire also has the advantage of easily generating cornering power, as it has not only the edge components in the tire circumferential direction but also the edge components in the tread width direction.

Furthermore, in the disclosed tire, the inclination angle of each inclined lateral groove 2 relative to the tread width direction is changed at each boundary part f so that the inclination angle $\beta$ in the side region 2E is smaller than the inclination angle $\alpha$ in the center region 2C. Hence, for example, the corners G of the blocks $b_6$ defined by the lateral grooves 2 and the circumferential grooves 1 do not have an extremely acute angle. The difference in rigidity within each block $b_6$ is thus reduced, so that uneven wear around the corners G of the blocks $b_6$ in the tread surface S can be suppressed.

When the inclination angle $\beta$ of the lateral groove 2 in the side region 2E is smaller than the inclination angle $\alpha$ of the lateral groove 2 in the center region 2C, the flow of water drained through the lateral groove 2 is stopped at the boundary part f, which would tend to cause lower drainage performance. In the disclosed tire, however, the groove width of the side region 2E increases from the boundary part f toward the circumferential groove 1. This ensures as high drainage performance as a lateral groove extending linearly at an angle of inclination relative to the tread width direction.

The inclination angle $\beta$ of the lateral groove 2 in one side region 2E and the inclination angle $\beta$ of the lateral groove 2 in the other side region 2E may be different from each other like the lateral grooves 2 illustrated in FIGS. 1 and 2, as long as the inclination angle $\beta$ of the lateral groove 2 in each side region 2E is smaller than the inclination angle $\alpha$ of the lateral groove 2 in the center region 2C.

In addition, the arrangement of the lateral grooves 2 such that, when the lateral grooves 2 are projected onto the tire equatorial plane, lateral grooves 2 adjacent in the tire circumferential direction do not overlap each other enhances rigidity in the tire width direction.

Figure 3:
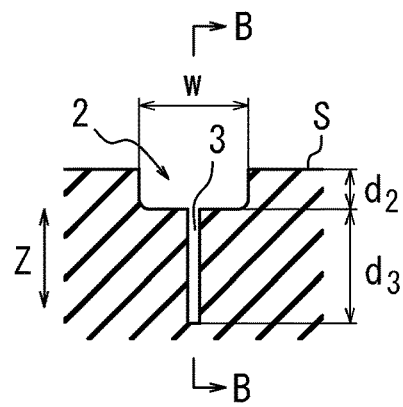
FIG. 3 is a sectional view along A-A in FIG. 1.

FIG. 3 is a sectional view of the lateral groove 2 along a plane (indicated by line A-A in FIG. 1) orthogonal to the extension direction of the lateral groove 2. The lateral groove 2 has a depth $d_2$ inward in the tire radial direction (direction Z in FIG. 3) from the tread surface S, and also has a sipe 3 which is a thin slit having a depth $d_3$ inward in the tire radial direction from the groove bottom of the lateral groove 2. Although the sipe 3 leads linearly inward in the tire radial direction in the example illustrated in FIG. 3, the sipe 3 may have another shape, such as zigzag or wavy, that bends one or more times on both sides in the tire circumferential direction.

Figure 4:
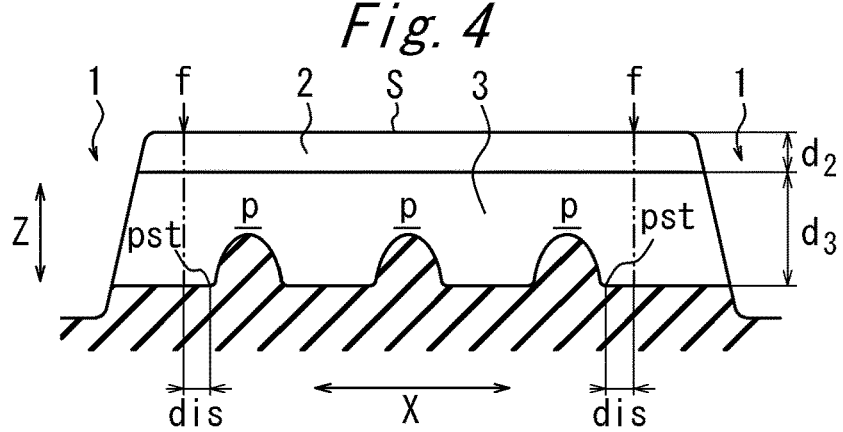
FIG. 4 is a sectional view along B-B in FIG. 3.

FIG. 4 is a sectional view of the lateral groove 2 along the center line (indicated by line B-B in FIG. 3) of the sipe 3, as seen from the direction perpendicular to the extension direction of the lateral groove 2. As illustrated in FIG. 4, the sipe 3 extends along the entire length of the lateral groove 2, and has a portion with a smaller sipe depth (hereafter referred to as a shallow portion p) near the boundary part f between the center region 2C and each side region 2E.

Thus, the disclosed tire has important features that the lateral groove 2 has the sipe 3 leading inward in the tire radial direction from the groove bottom of the lateral groove 2, and the sipe 3 has, only in the center region 2C of the lateral groove, a shallow portion p with a smaller depth, the shallow portion p being located at least near the boundary part f between the center region 2C and each side region 2E with the starting point pst of the shallow portion being apart from the boundary part f.

The lateral grooves 2 provide drainage paths of relatively large capacity on the tread surface S, thus maintaining drainage performance especially in the early to middle stages of tire use. In the middle to late stages of tire use, once the land portions 6 of the tread have worn out and the lateral grooves 2 have disappeared, the sipes 3 leading from the groove bottoms of the lateral grooves 2 are exposed at the tread surface S and keep maintaining the drainage performance of the tread. To facilitate the opening of each sipe to the circumferential groove 1 to maintain drainage performance after the land portion wears out and the lateral groove 2 disappears, each shallow portion p is located only in the center region 2C and not in the side regions 2E.

The functions and effects of each shallow portion p near the boundary part f of the lateral groove are described below. In the disclosed tire, the groove width of the lateral groove 2 in the side region 2E increases from the boundary part f toward the circumferential groove 1 in order to ensure drainage performance, as mentioned earlier. In such a tire, the rigidity of the block $b_6$ near the side region 2E tends to be lower than the rigidity of the block $b_6$ near the center region 2C, causing a drop in rigidity at the boundary part f. To appropriately suppress such a drop in rigidity, the disclosed tire has the shallow portion p near the boundary part f. Here, the location of the shallow portion p is limited to the center region 2C in order to ensure drainage performance in the late stage of tire use, as noted above. By forming the shallow portion p near the boundary part f within the area of the center region 2C to ensure the rigidity of the land portion 6 in this way, steering stability on wet road surfaces can be maintained while achieving favorable drainage performance with the wider opening to the circumferential groove 1.

Since the block $b_6$ is relatively low in rigidity near the side region 2E and relatively high in rigidity near the center region 2C, the rigidity drops at the boundary part f between the center region 2C and the side region 2E. The boundary part f is also an inflection point at which the extension direction of the lateral groove 2 changes. Therefore, when a force in the tire circumferential direction or the tire width direction is applied to the tread, the block $b_6$ deforms from the boundary part f, and becomes susceptible to chipping or breaking.

With the disclosed structure, the starting point pst of the shallow portion is apart from the boundary part f. This reduces the drop in rigidity, and prevents such block chipping or breaking.

Here, "near the boundary part f" means the range of 15% of the extension length of the lateral groove 2 centering the boundary part f along the lateral groove 2. In detail, "near the boundary part f" means the area between the point apart from the boundary part f to the circumferential groove 1 side by 7.5% of the extension length of the lateral groove 2 and the point apart from the boundary part f to the opposite side by 7.5% of the extension length of the lateral groove 2, along the lateral groove 2.

The position of the shallow portion p is defined with the part of the shallow portion p with the smallest sipe depth. In the case where the sipe depth of the shallow portion p is uniform, the center of the extension range of the shallow portion p is regarded as the part with the smallest sipe depth.

In the case where the boundary part f bends at an angle as illustrated in FIGS. 1 and 2, the bending point is regarded as the center of the boundary part f. In the case where the boundary part f is a gentle arc, the point with the smallest radius of curvature is regarded as the center of the boundary part f.

Preferably, the clearance distance dis between the boundary part f and the starting point pst of the shallow portion is 1.0 mm or more and 3.0 mm or less along the extension direction of the lateral groove 2 at the position of the shallow portion p. If the clearance distance dis is 1.0 mm or more, an increase of the drop in rigidity at the boundary part f is prevented favorably. If the clearance distance dis is 3.0 mm or less, the rigidity of the block $b_6$ at the tire width direction ends is prevented from decreasing, and uneven wear resistance is ensured more reliably.

Preferably, the depth of the sipe in the side region 2E is not less than the maximum depth of the sipe in the center region 2C. As mentioned earlier, especially after the lateral groove 2 disappears due to wear, the sipe 3 leading from the groove bottom of the lateral groove 2 maintains the drainage performance of the tread. Here, the greater sipe depth in the side region 2E facilitates the opening of the sipe 3 to the circumferential groove 1, as a result of which sufficient drainage into the circumferential groove 1 is achieved and excellent wet performance is ensured.

The bottom of the shallow portion p may be shaped like a semicircle as illustrated in FIG. 4, or may have another shape such as a triangle, a square, or a rectangle. The shallow portion p may be formed not only near the boundary part f but also in other areas according to need.

In the disclosed tire, preferably, three or more circumferential grooves 1 are formed in the tread surface S, and the pair of circumferential grooves 1 (width Ws) outermost in the tread width direction are wider than the other circumferential groove(s) 1 (width Wc) (extending along the tire equatorial plane in FIG. 1). In FIG. 1, Wc<Ws is preferable. With this structure, when ground contact pressure is applied, the land portions 6 between the circumferential grooves 1 outermost in the tread width direction support each other in the tread width direction, which enhances tread rigidity. Steering stability on wet road surfaces can be improved in this way.

Preferably, the groove width Wc of the other circumferential groove(s) 1 is 3 mm or more and 5 mm or less, to ensure the effect of the land portions 6 supporting each other.

Figure 5:
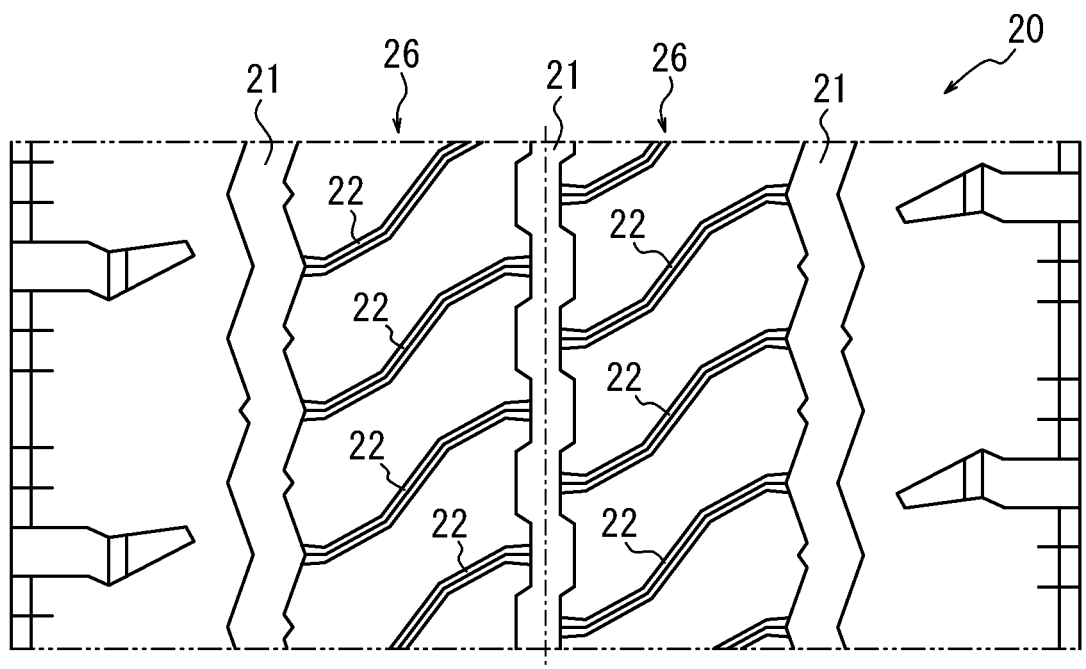
FIG. 5 is a partial development view illustrating the tread surface of a tire of a comparative example.

In the disclosed tire, preferably, the lateral groove 2 of the land portion 6 adjacent to one side of the circumferential groove 1 other than the circumferential grooves 1 outermost in the tread width direction and the lateral groove 2 of the land portion 6 adjacent to the other side of the other circumferential groove 1 are open to the other circumferential groove 1 at the same position in the tire circumferential direction. With this structure, the drainage efficiency of the land portions 6 as a whole is enhanced as compared with the case where the lateral groove 22 extending in one land portion 26 and the lateral groove 22 extending in the other land portion 26 have staggered positions of opening to the circumferential groove 21 extending along the tire equatorial plane as in, for example, a tire of a comparative example illustrated in FIG. 5. Hence, drainage performance on wet road surfaces can be further improved.

Preferably, the inclination angle α of the lateral groove 2 in the center region 2C is 30° or more and 35° or less, to attain both the rigidity of the block $b_6$ and the drainage performance of the tread. If the inclination angle α is excessively large, the drainage performance of the tread is improved, but the rigidity of the block in the tread width direction decreases, and uneven wear tends to occur during cornering of the vehicle. If the inclination angle α is excessively small, not only the drainage performance of the tread is insufficient, but also the edge components in the tread width direction are likely to be insufficient.

Preferably, the inclination angle β of the lateral groove 2 in the side region 2E is 5° or less.

The boundary part f of the lateral groove 2 is preferably located within the range of 5% or more and 20% or less of the extension length of the lateral groove 2 from the end edge e in the extension direction of the lateral groove 2, to suppress uneven wear around the corners of the blocks while ensuring the drainage performance of the tread.

Likewise, the ratio $W_1/W_2$ between the groove width $W_1$ of the lateral groove 2 at the boundary part f and the groove width $W_2$ of the lateral groove 2 at the end edge e is preferably 0.5 or more and 0.7 or less, to ensure sufficient drainage performance.

The depth $d_2$ of the lateral groove 2 and the maximum depth $d_3$ of the sipe 3 may be changed as appropriate within the range of $d_1 > d_3 \geq d_2$, where $d_1$ is the depth of the circumferential groove 1.

Although shoulder grooves 4 and short sipes 5 extending along the tread width direction are formed in the land portion between each of the pair of circumferential grooves 1 outermost in the tire width direction and the corresponding ground contact edge of the tread in the embodiment illustrated in FIG. 1, the disclosed tire is not limited to such a tread pattern.

EXAMPLES

The following describes examples according to the disclosure.

Example tires and Comparative Example tires (all tires have a tire size of 275/70R22.5) were experimentally produced according to the specifications shown in Table 1, and the uneven wear resistance of each tire and the steering stability (wet steering stability) and drainage performance of the tire on wet road surfaces were evaluated.

Example tire 1 has the tread pattern illustrated in FIG. 1. In detail, the lateral grooves 2 are arranged so that, when the lateral grooves 2 are projected onto the tire equatorial plane, lateral grooves 2 adjacent in the tire circumferential direction do not overlap each other. Each lateral groove 2 is made up of a center region 2C extending at an angle of inclination relative to the tread width direction and side regions 2E extending from both ends of the center region 2C toward the circumferential grooves 1 at a smaller angle of inclination relative to the tread width direction than the center region 2C, the side regions 2E increasing in groove width toward the circumferential grooves 1. Each lateral groove 2 has a sipe leading inward in the tire radial direction from the groove bottom of the lateral groove 2, and the sipe has a shallow portion p in the center region 2C at the position apart from the boundary part f between the center region 2C and each side region 2E by 0.5 mm.

Comparative Example tire 1 is the same as Example tire 1 except that it has no shallow portion p of the sipe.

Comparative Example tire 2 is the same as Example tire 1 except that, when the lateral grooves 2 are projected onto the tire equatorial plane, lateral grooves adjacent in the tire circumferential direction overlap each other.

Comparative Example tire 3 is the same as Example tire 1 except that the groove width of the lateral groove in the side regions 2E does not increase toward the respective circumferential grooves 1.

Comparative Example tire 4 is the same as Example tire 1 except that the clearance distance dis is 9.0 mm and the shallow portion p is not near the boundary part f.

Comparative Example tire 5 is the same as Example tire 1 except that the starting point pst of the shallow portion is at the boundary part f.

Example tire 2 is the same as Example tire 1 except that the clearance distance dis is 1.0 mm.

Example tire 3 is the same as Example tire 1 except that the clearance distance dis is 3.0 mm.

Example tire 4 is the same as Example tire 1 except that the clearance distance dis is 3.5 mm.

In the table, the ratio $W_2/W_2$ exceeding 1 is rated as "good", and the ratio $W_2/W_2$ not exceeding 1 is rated as "poor". The position near the boundary part f is within the range of 15% of the extension length of the lateral groove from the boundary part along the lateral groove.

(Uneven Wear Resistance)

Each sample tire was attached to an applicable rim (approved rim in applicable size in JATMA Year Book, etc.), filled to an internal pressure of 900 kPa, mounted on the front shaft of a test vehicle, and run on a test course for 40000 km. After this, the volume of the block with greatest uneven wear was measured, and the uneven wear resistance of the tire was evaluated from the inverse of the wear loss. The evaluation results are shown in Table 1. Table 1 shows indices with the result of Comparative Example tire 1 being 100, where a larger value denotes better uneven wear resistance.

(Wet Steering Stability)

Each sample tire in the above-mentioned state was mounted on the front shaft of the test vehicle, and a subjective test by a professional test driver was conducted on a course of a wet road surface (with a water depth of 2 mm). The evaluation results are shown in Table 1. Table 1 shows indices with the result of Comparative Example tire 1 being 100, where a larger value denotes better wet steering stability.

TABLE 1

| | Comp. Ex. 1 | Comp. Ex. 2 | Comp. Ex. 3 | Comp. Ex. 4 | Comp. Ex. 5 | Ex. 1 | Ex. 2 | Ex. 3 | Ex. 4 |
|---|---|---|---|---|---|---|---|---|---|
| $W_2/W_1$ | Good | Good | Poor | Good | Good | Good | Good | Good | Good |
| Overlap of lateral grooves in tire circumferential direction | No overlap | Overlap | No overlap | No overlap | No overlap | No overlap | No overlap | No overlap | No overlap |
| Shallow portion | Not present | Present | Present | Present | Present | Present | Present | Present | Present |
| Clearance distance dis from boundary part to starting point of shallow portion (mm) | — | 0.5 | 0.5 | 9.0 | 0 | 0.5 | 1 | 3 | 3.5 |

TABLE 1-continued

|  | Comp. Ex. 1 | Comp. Ex. 2 | Comp. Ex. 3 | Comp. Ex. 4 | Comp. Ex. 5 | Ex. 1 | Ex. 2 | Ex. 3 | Ex. 4 |
|---|---|---|---|---|---|---|---|---|---|
| Wet steering stability (INDEX) | 100 | 100 | 97 | 100 | 98 | 100 | 100 | 100 | 100 |
| Uneven wear resistance (INDEX) | 100 | 97 | 102 | 95 | 105 | 105 | 110 | 110 | 105 |

REFERENCE SIGNS LIST 1, 21 circumferential groove
2, 22 lateral groove
2C center region
2E side region
3 sipe
4 shoulder groove
5 short sipe
6 land portion
10, 20 tire
G corner of block
e end edge of lateral groove
f boundary part of lateral groove
p shallow portion of sipe

The invention claimed is:

1. A tire in which a plurality of land portions are defined in a tread surface by a plurality of circumferential grooves extending in a tire circumferential direction, and each of the plurality of land portions has a plurality of lateral grooves crossing the land portion,
   wherein the plurality of lateral grooves are arranged so that, when the plurality of lateral grooves are projected onto a tire equatorial plane, lateral grooves adjacent in the tire circumferential direction do not overlap each other,
   each of the plurality of lateral grooves is made up of a center region linearly extending at an angle of inclination relative to a tread width direction and side regions linearly extending from both ends of the center region toward respective circumferential grooves at a smaller angle of inclination relative to the tread width direction than the center region, the side regions increasing in groove width toward the respective circumferential grooves, and
   each of the plurality of lateral grooves has a side leading inward in a tire radial direction from a groove bottom of the lateral groove, and the side has, only in the center region, a shallow portion with a smaller depth, the shallow portion being located at least near a boundary part, which has a bend shape with an angle, between the center region and each of the side regions with a starting point of the shallow portion being apart from the boundary part.

2. The tire according to claim 1,
   wherein a depth of the sipe in the side regions is not less than a maximum depth of the sipe in the center region.

3. The tire according to claim 2,
   wherein a clearance distance between the boundary part and the starting point of the shallow portion is 1.0 mm or more and 3.0 mm or less along an extension direction of the lateral groove at a position of the shallow portion.

4. The tire according to claim 3,
   wherein three or more circumferential grooves are formed in the tread surface, and a pair of circumferential grooves outermost in the tread width direction are wider than a circumferential groove other than the pair of circumferential grooves.

5. The tire according to claim 2,
   wherein three or more circumferential grooves are formed in the tread surface, and a pair of circumferential grooves outermost in the tread width direction are wider than a circumferential groove other than the pair of circumferential grooves.

6. The tire according to claim 1,
   wherein a clearance distance between the boundary part and the starting point of the shallow portion is 1.0 mm or more and 3.0 mm or less along an extension direction of the lateral groove at a position of the shallow portion.

7. The tire according to claim 6,
   wherein three or more circumferential grooves are formed in the tread surface, and a pair of circumferential grooves outermost in the tread width direction are wider than a circumferential groove other than the pair of circumferential grooves.

8. The tire according to claim 1,
   wherein three or more circumferential grooves are formed in the tread surface, and a pair of circumferential grooves outermost in the tread width direction are wider than a circumferential groove other than the pair of circumferential grooves.

9. The tire according to claim 8,
   wherein a lateral groove of a land portion adjacent to one side of the other circumferential groove and a lateral groove of a land portion adjacent to the other side of the other circumferential groove are open to the other circumferential groove at the same position in the tire circumferential direction.

* * * * *